US012113895B2

(12) United States Patent
Liu et al.

(10) Patent No.: US 12,113,895 B2
(45) Date of Patent: Oct. 8, 2024

(54) KEY MANAGEMENT SYSTEM PROVIDING SECURE MANAGEMENT OF CRYPTOGRAPHIC KEYS, AND METHODS OF OPERATING THE SAME

(71) Applicant: PUFsecurity Corporation, Hsinchu County (TW)

(72) Inventors: Yung-Hsiang Liu, Hsinchu County (TW); Meng-Yi Wu, Hsinchu County (TW); Ching-Sung Yang, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 267 days.

(21) Appl. No.: 17/541,262

(22) Filed: Dec. 3, 2021

(65) Prior Publication Data
US 2022/0191017 A1  Jun. 16, 2022

Related U.S. Application Data

(60) Provisional application No. 63/124,085, filed on Dec. 11, 2020.

(51) Int. Cl.
*H04L 9/08* (2006.01)
*G06F 9/4401* (2018.01)
(Continued)

(52) U.S. Cl.
CPC .......... *H04L 9/0866* (2013.01); *G06F 9/4401* (2013.01); *G06F 21/575* (2013.01);
(Continued)

(58) Field of Classification Search
CPC ..... H04L 9/0866; H04L 9/085; H04L 9/0894; H04L 9/3228; H04L 9/3234;
(Continued)

(56) References Cited

U.S. PATENT DOCUMENTS

| 5,495,533 A * | 2/1996 | Linehan | H04L 9/0822 |
| | | | 713/155 |
| 11,625,478 B2 * | 4/2023 | Cambou | H04L 9/3278 |
| | | | 726/6 |

(Continued)

FOREIGN PATENT DOCUMENTS

| CN | 1236581 C | 1/2006 |
| CN | 1270470 C | 8/2006 |

(Continued)

OTHER PUBLICATIONS

PUF-based IP Solutions / Solutions extended with core IPs—NeoPUF and OTP, Security IP Solutions / Reliable and Flexible / PUFsecurity, Dec. 17, 2019, p. 1-4, vol. XP055916250, PUFsecurity, retrieved from https://www.pufsecurity.com/products.

(Continued)

*Primary Examiner* — David R Lazaro
*Assistant Examiner* — Berhanu Shitayewoldetadik
(74) *Attorney, Agent, or Firm* — Winston Hsu (57) ABSTRACT

A method of operating the physically unclonable function (PUF)-based key management system includes upon receiving a key generation request including a parameter, a load balancer dispatching a key generation request including a parameter from an external device according to workloads of a plurality of key management components (KMCs). A KMC having minimum workload among the plurality of KMCs is designated as the key-generation KMC and the key generation request is dispatched thereto, and remaining KMCs of the plurality of KMCs are designated as backup KMCs. The method further includes the key-generation KMC generating a key according to the parameter and a first PUF sequence, transmitting the key and an identifier associated therewith to the backup KMC via a backup channel,
(Continued)

and the backup KMC generating a wrapped key according to the key and a second PUF sequence.

7 Claims, 6 Drawing Sheets

(51) Int. Cl.
    *G06F 11/10*     (2006.01)
    *G06F 15/16*     (2006.01)
    *G06F 21/57*     (2013.01)
    *H04L 9/32*     (2006.01)
    *H04L 15/16*     (2006.01)

(52) U.S. Cl.
    CPC ............ *H04L 9/085* (2013.01); *H04L 9/0894* (2013.01); *H04L 9/3228* (2013.01); *H04L 9/3234* (2013.01); *H04L 9/3278* (2013.01); *G06F 2221/034* (2013.01)

(58) Field of Classification Search
    CPC ... H04L 9/3278; H04L 9/0869; H04L 9/3247; G06F 9/4401; G06F 21/575; G06F 2221/034; G06F 7/588; G06F 21/10; G06F 21/73; G09C 1/00
    USPC .......................................................... 380/44
    See application file for complete search history.

(56) References Cited

U.S. PATENT DOCUMENTS

| | | | | |
|---|---|---|---|---|
| 2005/0015471 | A1* | 1/2005 | Zhang | H04L 67/1001 726/4 |
| 2009/0092252 | A1* | 4/2009 | Noll | H04L 9/083 380/277 |
| 2014/0010371 | A1 | 1/2014 | Khazan | |
| 2014/0089659 | A1* | 3/2014 | Brickell | G06F 21/73 713/155 |
| 2015/0012737 | A1 | 1/2015 | Newell | |
| 2016/0352518 | A1* | 12/2016 | Ford | G06F 21/6218 |
| 2017/0006018 | A1* | 1/2017 | Campagna | H04L 9/088 |
| 2018/0097621 | A1* | 4/2018 | Cotta | H04L 9/0866 |
| 2018/0255033 | A1* | 9/2018 | Kanaya | H04W 12/03 |
| 2018/0262331 | A1 | 9/2018 | Noguchi | |
| 2020/0313911 | A1* | 10/2020 | Mondello | H04L 9/3268 |
| 2021/0234678 | A1* | 7/2021 | Armleder | H04L 9/0822 |
| 2022/0067140 | A1* | 3/2022 | Cambou | G06F 21/45 |
| 2022/0067221 | A1* | 3/2022 | Schiattarella | H04L 9/088 |
| 2023/0208633 | A1* | 6/2023 | Munro | H04L 9/0822 713/171 |

FOREIGN PATENT DOCUMENTS

| | | |
|---|---|---|
| CN | 104980268 A | 10/2015 |
| CN | 104025500 B | 7/2017 |
| CN | 107171796 A | 9/2017 |
| CN | 107194285 A | 9/2017 |
| CN | 108632038 A | 10/2018 |
| CN | 109995507 A | 7/2019 |
| CN | 110233729 A | 9/2019 |
| CN | 108092776 B | 11/2020 |
| KR | 10-2015-0051012 A | 5/2015 |
| KR | 10-2016-0109891 A | 9/2016 |
| TW | 201933169 A | 8/2019 |
| WO | 2015/180867 A1 | 12/2015 |

OTHER PUBLICATIONS

Wang Mian, Zhou Yujie; A Mechanism of Secure Key Backup and Key Recovery Based on Hardware; Microcomputer Information; vol. 21, No. 10-3, p. 11, 12, 153, 2005.

LI Xiao-yong, Zuo Xiao-dong, Shen Chang-xiang; Secure control of sensitive information flow in trusted computing environment; Computer Engineering and Design; vol. 28, No. 15, p. 3569-3572, Aug. 2007, Aug. 8, 2007.

Feng Li, Deng Guoqing, Yu Bin; Multi-Level Key Management Scheme for Multi-Level Removable Storage Devices, Journal of Information Security Research; vol. 4, No. 4, p. 329-335, Apr. 2018, Apr. 5, 2018.

\* cited by examiner

KEY MANAGEMENT SYSTEM PROVIDING SECURE MANAGEMENT OF CRYPTOGRAPHIC KEYS, AND METHODS OF OPERATING THE SAME

CROSS REFERENCE TO RELATED APPLICATIONS

This non-provisional application claims priority of U.S. Provisional Patent Application No. 63/124,085, filed on 11 Dec. 2020, included herein by reference in its entirety.

BACKGROUND OF THE INVENTION

1. Field of the Invention

The invention relates to cryptography, and in particular, to a key management system providing secure management of cryptographic keys, and methods of managing the same.

2. Description of the Prior Art

In cryptography, a cryptographic key is a string of characters used in an encryption algorithm to randomize data. The cryptographic key locks the data to allow only the authorized party to unlock and gain access to the data. Therefore, the cryptographic key plays an important role in cryptography and must be managed with care. At present, a key generator is used to generate cryptographic keys, and the cryptographic keys are stored in a secure memory. However, the key generator is unable to operate efficiently upon receiving excessive requests, and the cryptographic keys will not serviceable upon damage or loss of the secure memory.

SUMMARY OF THE INVENTION

According to an embodiment of the invention, a key management system based on a physically unclonable function (PUF) includes a plurality of key management components, a backup channel and a load balancer. Each key management component includes a PUF unit, a key derivation function (KDF) logic coupled to the PUF unit, a key wrap (KWP) logic coupled to the PUF unit, and a memory coupled to the KDF logic and the KWP logic. The backup channel is coupled to the plurality of key management components. The load balancer is coupled to the plurality of key management components, and is used to dispatch a key generation request including a parameter from an external device according to workload of each KMC. The KMC having minimum workload among the plurality of KMCs is designated as the key-generation KMC and the key generation request is dispatched thereto, and remaining KMCs of the plurality of KMCs are designated as backup KMCs. Upon receiving the key generation request, a PUF unit of the key-generation KMC is configured to generate a first PUF sequence, a KDF logic of the key-generation KMC is configured to generate a key according to the parameter and the first PUF sequence, the key-generation KMC is configured to transmit a key storage request including the key and a first identifier associated therewith to the backup KMCs through the backup channel and transmit the first identifier to the external device, a KWP logic of the key-generation KMC is disabled, and a memory of the key-generation KMC is configured to store the first identifier and the parameter associated therewith. Once the backup KMCs receive the key storage request, each PUF unit of each backup KMC is configured to generate a second PUF sequence, each KDF logic of the each backup KMC is disabled, each KWP logic of the each backup KMC is configured to generate a wrapped key according to the key and the second PUF sequence, and a memory of the backup KMC is configured to store the first identifier and the wrapped key associated therewith.

According to another embodiment of the invention, a physically unclonable function (PUF)-based key management system includes a load balancer, a plurality of key management components (KMCs) and a backup channel. The load balancer is coupled to the plurality of KMCs. The backup channel is coupled to the plurality of KMCs. Each KMC includes a PUF unit, a key derivation function (KDF) logic, a key wrap (KWP) logic and a memory. A method of operating the PUF-based key management system includes the load balancer dispatching a key generation request including a parameter from an external device according to workload of each KMC, wherein a KMC having minimum workload among the plurality of KMCs is designated as the key-generation KMC and the key generation request is dispatched thereto, and remaining KMCs of the plurality of KMCs are designated as backup KMCs, and disabling a KWP logic of the key-generation KMC and KDF logics of the backup KMCs of the plurality of KMCs. The method further includes upon the key-generation KMC receiving the key generation request, a PUF unit of the key-generation KMC generating a first PUF sequence, and a KDF logic of the key-generation KMC generating a key according to the parameter and the first PUF sequence, the key-generation KMC transmitting the first identifier to the external device, a memory of the key-generation KMC storing the first identifier and the parameter, and the key-generation KMC transmitting a key storage request including the key and a first identifier associated therewith to the backup KMCs via the backup channel. Furthermore, the method includes once the backup KMCs receive the key storage request, each PUF unit of each backup KMC generating a second PUF sequence, and each KWP logic of the each backup KMC generating a wrapped key according to the key and the second PUF sequence, and each memory of the each backup KMC storing the first identifier and the wrapped key.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
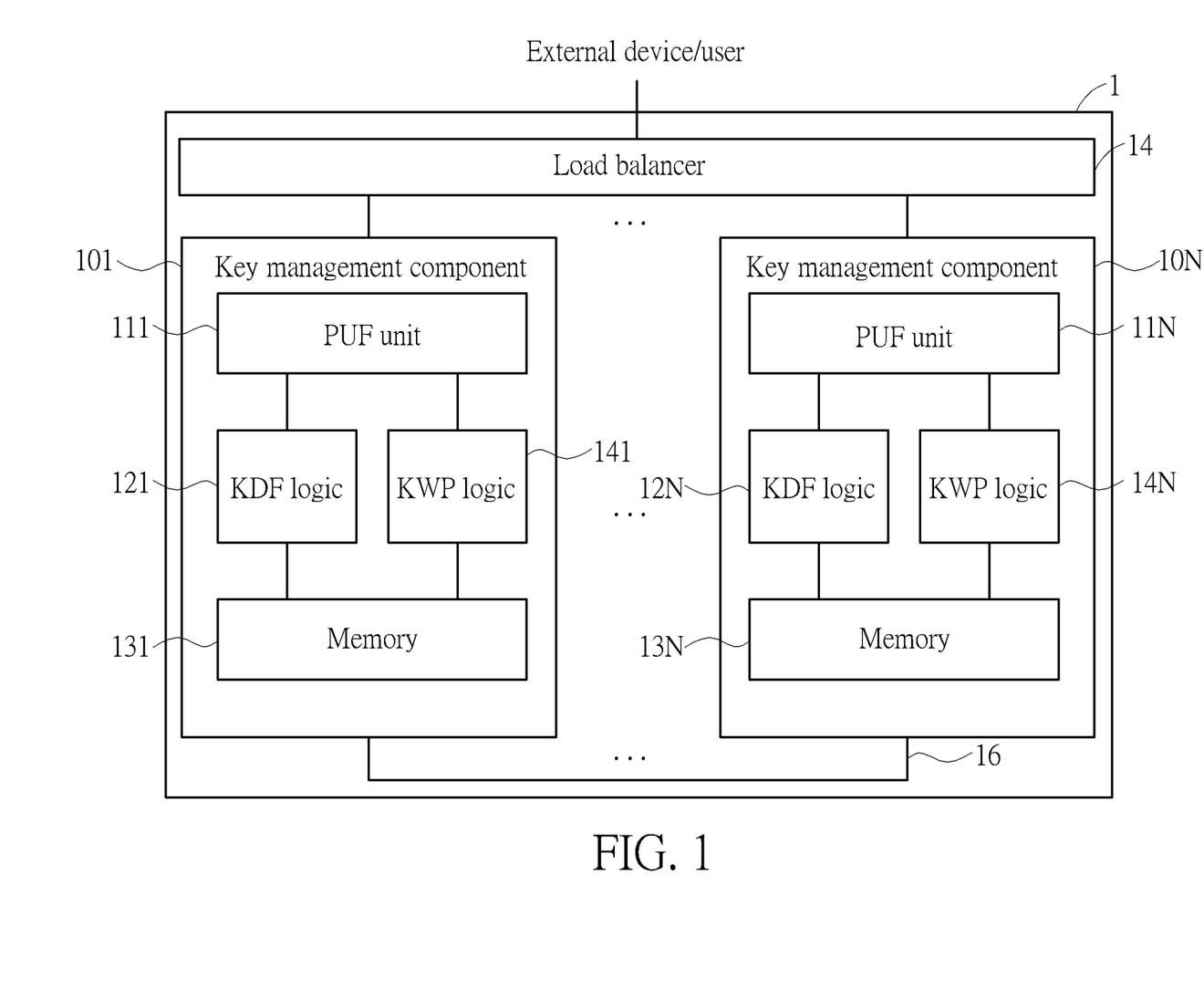
FIG. 1 is a block diagram of a key management system according to an embodiment of the invention.

FIG. 1 is a block diagram of a physically unclonable function (PUF)-based key management system 1 according to another embodiment of the invention. The key management system 1 may manage generation, storage, retrieval and revocation of cryptographic keys. Specifically, the key management system 1 may store one or more backup copies of the cryptographic keys in a simple, reliable and secure manner, and may restore the cryptographic keys from the backup copies upon request. Furthermore, the key management system 1 employs PUF units for key generation and key backup, and consequently, the security of data storage in the key management system 1 can be ensured without further encryption. In addition, the key management system 1 utilizes a load balancer to distribute workloads among a plurality of key management components, providing a viable option for expanding a system capacity for handling excessive requests by increasing the number of the key management components.

The key management system 1 includes a load balancer 14, key management components 10₁ to 10N, and a backup channel 16, N being a positive number exceeding 1. The load balancer 14 is coupled to the key management components 10₁ to 10N. The backup channel 16 is coupled to the key management components 10₁ to 10N. In some embodiments, the key management components 10₁ to 10N may be located on a common device, and the backup channel 16 may be a data bus, e.g., a universal serial bus (USB). In other embodiments, the key management components 10₁ to 10N may be located on different devices, and the backup channel 16 may be a network channel, e.g., an ethernet or Internet.

Each key management components 10n may serve as a key generator or a key backup storage. The key generator may generate a key using a PUF sequence unique to the key generator, and the key backup storage may generate and store a backup copy of the key using another PUF sequence unique to the key backup storage. Therefore, only the key generator can recover the key using the PUF sequence of the key generator, and only the key backup storage can recover the key using the PUF sequence of the key backup storage, thereby enhancing securities of the key.

An external device/user may need a key for use in a cryptographic operation, and send a key generation request to the key management system 1. The external device/user may be authorized and/or authenticated to access the key management system 1. The key generation request may include a parameter for use to generate a key. The parameter may be salted using random data and then embedded in the key generation request. The load balancer 14 may receive the key generation request, determine respective workloads of the key management components 10₁ to 10N, select a key management component from the key management components 10₁ to 10N according to the workloads, and dispatch the key generation request to the selected key management component. The selected key management component may have the minimum workload among the key management components 10₁ to 10N. The selected key management component may serve as the key generator, and the remaining key management components may serve as the key backup storages. For example, upon receiving a key generation request, the load balancer 14 may determine that a key management component 10p has the minimum workload among the key management components 10₁ to 10N, and dispatch the key generation request to the key management component 10p, p being a positive number ranging between 1 and N. For each key generation request, only one key management component 10p may serve as the key generator, while one or more key management components 10q may serve as the key backup storages, q being a positive number ranging between 1 and N and q being different from p. As the number of the key management components 10₁ to 10N is expanded, the load balancer 14 may ensure that the system capacity of the key management system 1 will be increased in a linear manner.

In the following paragraphs, the operations of the key management system 1 will be explained with the key management component 10p being the key generator, and the key management component 10q being the key backup storage.

Each key management components 10n includes a PUF unit 11n, a key derivation function (KDF) logic 12n, a key wrap (KWP) logic 14n and a memory 13n, n being a positive number ranging between 1 and N. The KDF logic 12n and the KWP logic 14n are coupled to the PUF unit 11n and the memory 13n. For example, the key management component 10p includes a PUF unit 11p, a KDF logic 12p, a KWP logic 14p and a memory 13p. The KDF logic 12p and the KWP logic 14p are coupled to the PUF unit 11p and the memory 13p. The key management component 10q includes a PUF unit 11q, a KDF logic 12q, a KWP logic 14q and a memory 13q. The KDF logic 12q and the KWP logic 14q are coupled to the PUF unit 11q and the memory 13q. In some embodiments, upon selecting the key generator, the load balancer 14 may disable the KWP logic 14p, and disable the KDF logic 12q.

In the key management component 10p, the PUF unit 11p may generate a first PUF sequence. The KDF logic 12p may generate a key according to the parameter from the key generation request and the first PUF sequence upon receiving the key generation request. The first identifier may be generated internally by the KDF logic 12p or provided from the key generation request. In some embodiments, the KDF logic 12p may employ a key derivation function (KDF) to derive the key using the parameter and the first PUF sequence. The memory 13p may store the first identifier and the parameter. Since the PUF unit 11p is adopted to generate the key, the first identifier and the parameter can be stored in the memory 13p without further encryption while ensuring data security. The key management component 10p may transmit a key generation response to the external device/user, and transmit a key storage request to the key management component 10q via the backup channel 16. The key generation response may include the first identifier. The external device/user may retrieve the key from the key management system 1 using the first identifier. The key storage request may include the key and the first identifier associated therewith. The key management component 10q may generate a backup copy of the key using the key and/or the first identifier. The backup channel 16 may be a secure channel or an unsecure channel.

In the key management component 10q, the PUF unit 11q may generate a second PUF sequence. The KWP logic 14q may generate a first wrapped key according to the key and the second PUF sequence upon receiving the key storage request. In some embodiments, the KWP logic 14q may apply a key wrapping algorithm to encrypt the key using the second PUF sequence to generate the first wrapped key. In other embodiments, the KWP logic 14q may apply a key wrapping algorithm to encrypt the key using the second PUF sequence and the first identifier to generate the first wrapped key. The memory 13q may store the first identifier and the first wrapped key. Since the PUF unit 11q is adopted to generate the wrapped key, the first identifier and the wrapped key can be stored in the memory 13q without further encryption while ensuring data security.

Figure 2:
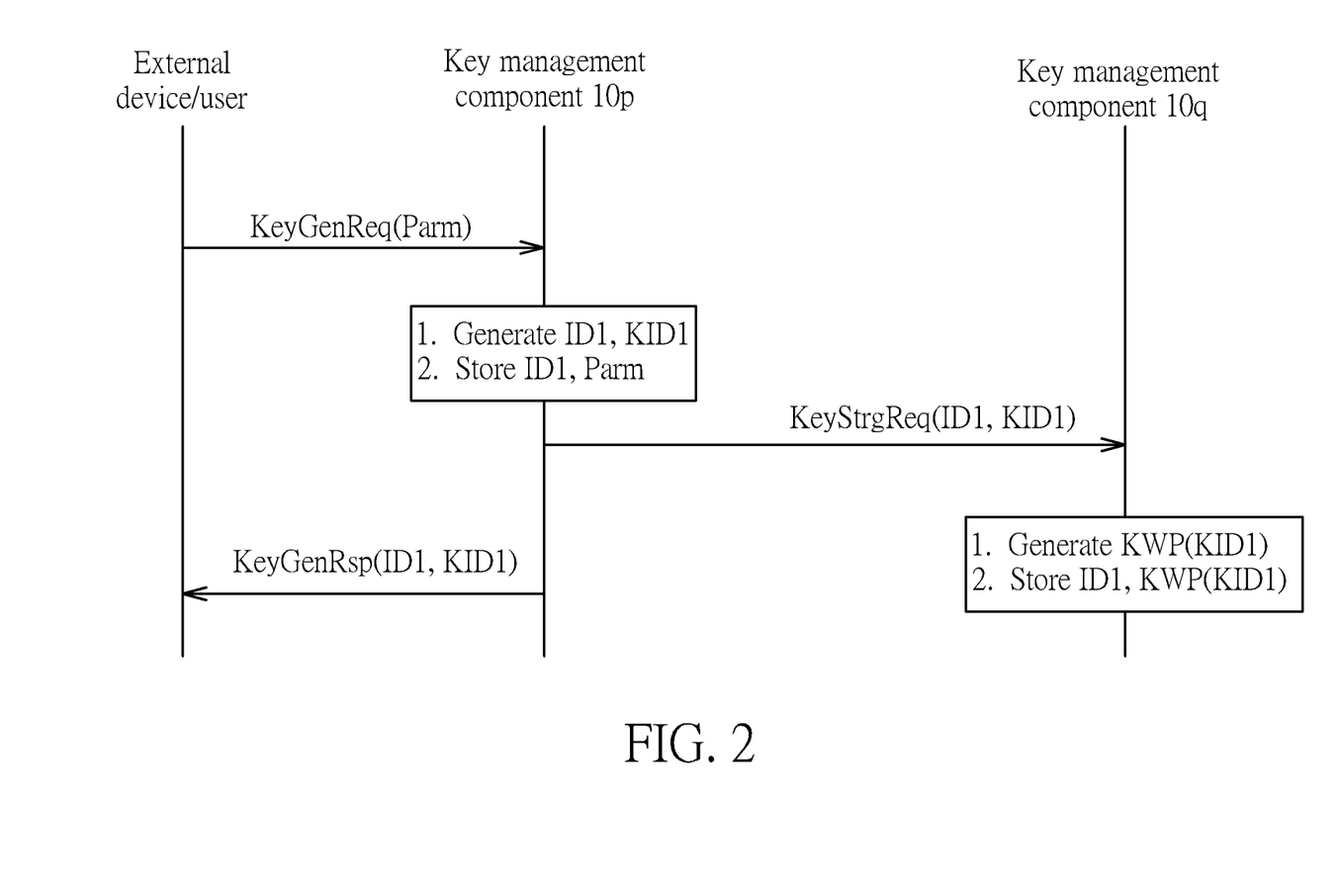
FIG. 2 is a message sequence chart of the key management system in FIG. 1 for key generation.

FIG. 2 is a message sequence chart of the key management system 1, showing message exchanges between the external device/user, the key management component 10p and 10q. The external device/user can initiate a key generation request KeyGenReq including a parameter Parm to the key management component 10p. Upon the key management component 10p receiving the key generation request KeyGenReq, the PUF unit 11p generates a first PUF sequence; the KDF logic 12p generates a key KID1 according to the parameter Parm and the first PUF sequence, and generates a first identifier ID1; and the memory 13p stores first identifier ID1 and the parameter Parm. Since the parameter Parm is saved in the memory 13p, the key management component 10p can always restore the key KID1 later by regenerating the first PUF sequence, reading the parameter Parm from the memory 13p, and deriving the key KID1 according to the first PUF sequence and the parameter Parm. Next, the key management component 10p transmits a key storage request KeyStrgReq including the key KID1 and first identifier ID1 associated therewith to the key management component 10q via the backup channel 16, and transmits a key generation response KeyGenRsp including the key KID1 and first identifier ID1 associated therewith to the external device/user. The external device/user can employ the key KID1 for performing cryptographic functions, and save the first identifier ID1 for subsequent use. Upon the key management component 10q receiving the key storage request, the PUF unit 11q generates a second PUF sequence, the KWP logic 14q generates a first wrapped key KWP (KID1) according to the key KID1 and the second PUF sequence (S208), and the memory 13q stores first identifier ID1 and the first wrapped key KWP(KID1), thus completing the process of key generation. Since the first identifier ID1 is saved in the memory 13q, the key management component 10q can always restore the key KID1 later by regenerating the second PUF sequence, reading the first wrapped key KWP(KID1) from the memory 13q, and deriving the key KID1 according to the second PUF sequence and the first wrapped key KWP(KID1).

When the external device/user would like to retrieve the key from key management system 1, the external device/user may transmit a key retrieval request to the key management system 1. The key retrieval request may include a parameter for use to retrieve the key. The load balancer 14 may receive the key retrieval request, determine respective workloads of the key management components 10₁ to 10N, select a key management component from the key management components 10₁ to 10N according to the workloads, and dispatch the key generation request to the selected key management component. The selected key management component may have the minimum workload among the key management components 10₁ to 10N. The selected key management component may be the key generator (key management component 10p) or the key backup storage (key management component 10q).

Figure 3:
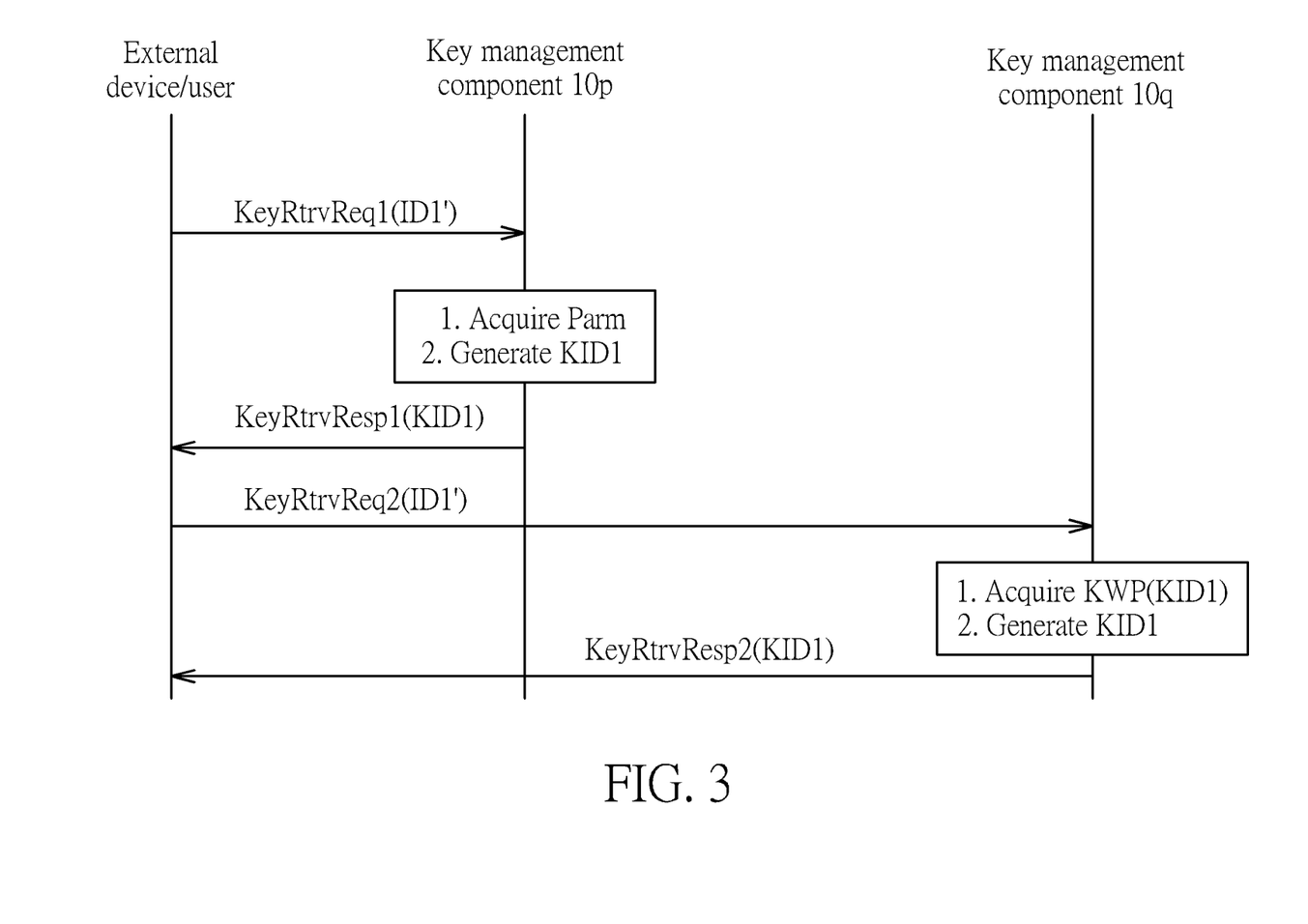
FIG. 3 is a message sequence chart of the key management system in FIG. 1 for key retrieval.

FIG. 3 is a message sequence chart of the key management system 1 for restoring the key KID1 from the key management component 10p or 10q. The external device/user can issue a key retrieval request KeyRtrvReq1 including a second identifier ID1' to the key management system 1. The load balancer 14 selects the key management component 10p for key retrieval, and dispatches the key retrieval request KeyRtrvReq1 to the key management component 10p. Upon the key management component 10p receiving the key retrieval request KeyRtrvReq1, the KDF logic 12p searches the memory 13p to find a match of the second identifier ID1' from the memory 13p by determining whether the second identifier ID1' matches the first identifier ID1 in the memory 13p. In some embodiments, the KDF logic 12p may determine that the second identifier ID1' matches the first identifier ID1 if the second identifier ID1' and the first identifier ID1 are identical or complementary, or satisfy a predefined relationship. Conversely, the KDF logic 12p may determine that the second identifier ID1' does not match the first identifier ID1 if the second identifier ID1' and the first identifier ID1 are different or do not satisfy the predefined relationship. In FIG. 3, the KDF logic 12p determines that the second identifier ID1' matches the first identifier ID1, and therefore, the KDF logic 12p acquires the parameter Parm associated with the first identifier ID1 from the memory 13p, the PUF unit 11p generates the first PUF sequence, and KDF logic 12p generates the key KID1 according to the first PUF sequence and the parameter Parm. The key management component 10p then transmits a key retrieval response KeyRtrvResp1 including the key KID1 to the external device/user, thus completing the process of key retrieval from a key generator (key management component 10p).

Later, the external device/user can issue a key retrieval request KeyRtrvReq2 including the second identifier ID1' to the key management system 1. The load balancer 14 selects the key management component 10q for key retrieval, and dispatches the key retrieval request KeyRtrvReq2 to the key management component 10q. Upon the key management component 10q receiving the key retrieval request KeyRtrvReq2, the KWP logic 14q searches the memory 13q to find a match of the second identifier ID1' from the memory 13q by determining whether the second identifier ID1' matches the first identifier ID1 in the memory 13q. The second identifier ID1' matches the first identifier ID1 if the second identifier ID1' and the first identifier ID1 are identical or complementary, or satisfy a predefined relationship. The second identifier ID1' does not match the first identifier ID1 if the second identifier ID1' and the first identifier ID1 are different or do not satisfy the predefined relationship. In FIG. 3, the KWP logic 14q determines that the second identifier ID1' matches the first identifier ID1, and therefore, the KWP logic 14q acquires the first wrapped key KWP(KID1) associated with the first identifier ID1 from the memory 13q, the PUF unit 11p generates the second PUF sequence, and KWP logic 14q generates the key KID1 according to the first wrapped key KWP(KID1) and the second PUF sequence. The key management component 10q then transmits a key retrieval response KeyRtrvResp2 including the key KID1 to the external device/user, thus completing the process of key retrieval from a key backup storage (key management component 10q).

While only one key backup storage (key management component 10q) is shown in FIGS. 2 and 3, those skilled in the art may recognize that more than one key backup storages may be incorporated in the key management system 1 for backing up the key. In this manner, the key management system 1 can keep multiple copies of the key to enhance data security. For example, in another key management component 10q', a PUF unit 11q' may generate a third PUF sequence. A KWP logic 14q' may generate a second wrapped key according to the key and the third PUF sequence upon receiving the key storage request. The second wrapped key may be different from the first wrapped key and may only be decrypted by the third PUF sequence. A memory 13q' may store the first identifier ID1 and the second wrapped key. A KDF 12q' may be disabled.

Figure 4:
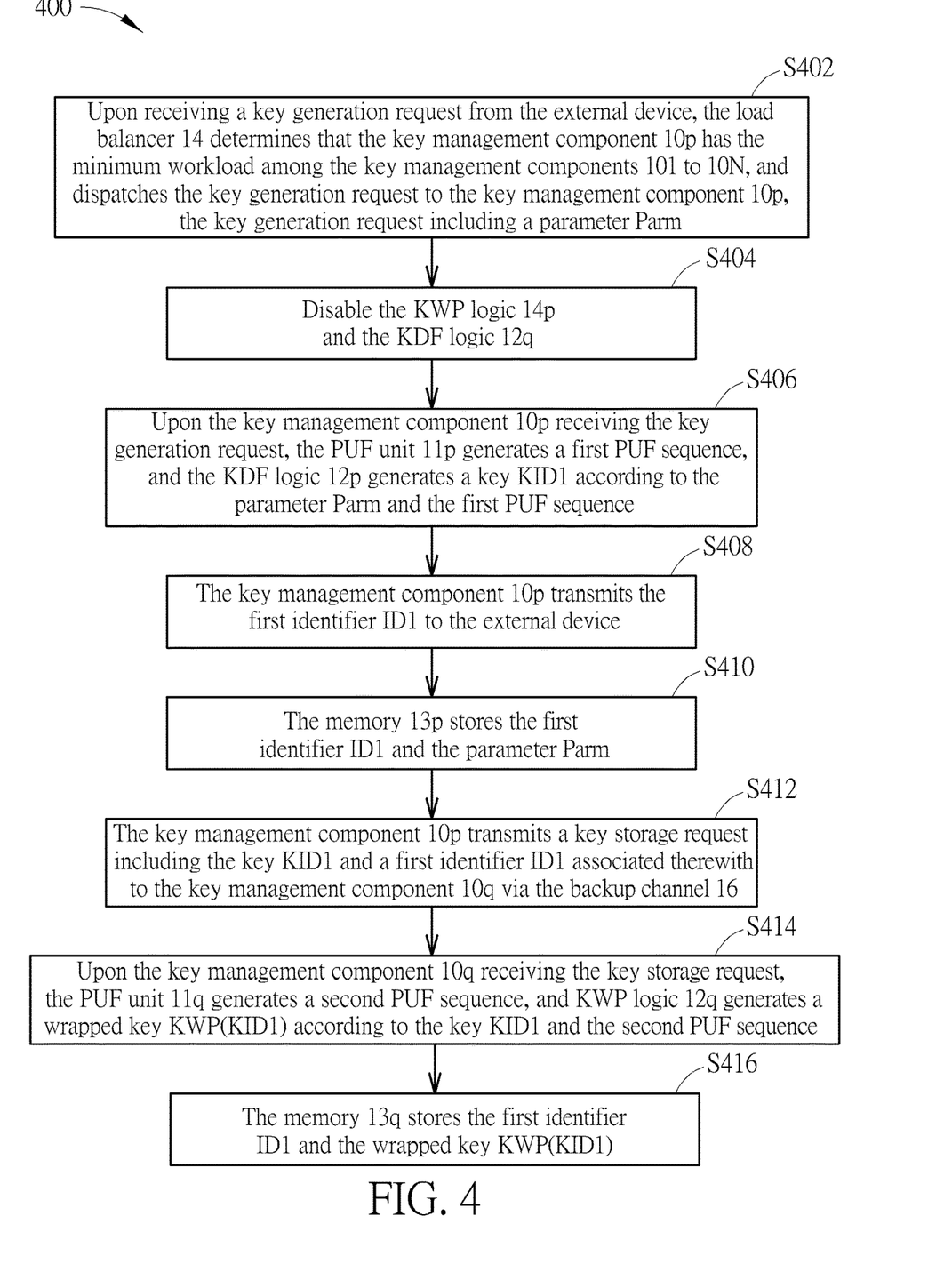
FIG. 4 is a flowchart of a method of operating the key management system in FIG. 1 for key generation.

FIG. 4 is a flowchart of a method 400 of operating the key management system 1 for key generation. The method 400 includes Steps S402 to S416. Any reasonable technological change or step adjustment is within the scope of the disclosure. Steps S402 to S416 are provided as follows:

Step S402: Upon receiving a key generation request from the external device, the load balancer 14 determines that the key management component 10$p$ has the minimum workload among the key management components 101 to 10N, and dispatches the key generation request to the key management component 10$p$, the key generation request including a parameter Parm;

Step S404: Disable the KWP logic 14$p$ and the KDF logic 12$q$;

Step S406: Upon the key management component 10$p$ receiving the key generation request, the PUF unit 11$p$ generates a first PUF sequence, and the KDF logic 12$p$ generates a key KID1 according to the parameter Parm and the first PUF sequence;

Step S408: The key management component 10$p$ transmits the first identifier ID1 to the external device;

Step S410: The memory 13$p$ stores the first identifier ID1 and the parameter Parm;

Step S412: The key management component 10$p$ transmits a key storage request including the key KID1 and a first identifier ID1 associated therewith to the key management component 10$q$ via the backup channel 16;

Step S414: Upon the key management component 10$q$ receiving the key storage request, the PUF unit 11$q$ generates a second PUF sequence, and KWP logic 12$q$ generates a wrapped key KWP(KID1) according to the key KID1 and the second PUF sequence;

Step S416: The memory 13$q$ stores the first identifier ID1 and the wrapped key KWP(KID1).

In Step S402, the load balancer 14 selects the key management component 10$p$ for use as the key generator based on the workloads of the key management components 101 to 10N. In some embodiments, the key management component 10$p$ may have the lowest workload among the key management components 101 to 10N at the time of receiving the key generation request, so as to achieve load balance of the key management components 101 to 10N. In Step S404, since the key management component 10$p$ serves as the key generator, the KWP logic 14$p$ is not used for key generation and will be disabled. The key management component 10$q$ serves as the key backup storage, the KDF logic 12$q$ is not used for key backup storage and will be disabled.

In Steps S406 to S412, the key management component 10$p$ generates a key KID1 in response to the key generation request, transmits a key generation response including the first identifier ID1 to the external device, stores the first identifier ID1 and the parameter Parm for subsequent use, and transmits a key backup request to the key management component 10$q$ via the backup channel 16. The key generation response includes the first identifier ID1. The key backup request includes the key KID1 and the first identifier ID1 associated therewith.

In Steps S414 and S416, the key management component 10$q$ generates a wrapped key KWP(KID1) in response to the key storage request, and stores the first identifier ID1 and the wrapped key KWP(KID1) for subsequent use.

Accordingly, the key management system 1 may receive a key retrieval request from the external device/user. Upon receiving the key retrieval request, the load balancer 14 may select a key management component based on the workloads of the key management components 101 to 10N for restoring the key. That is, the selected key management component for restoring the key may be the key management component 10$p$ or 10$q$, i.e., the key generator or the key backup storage.

Figure 5:
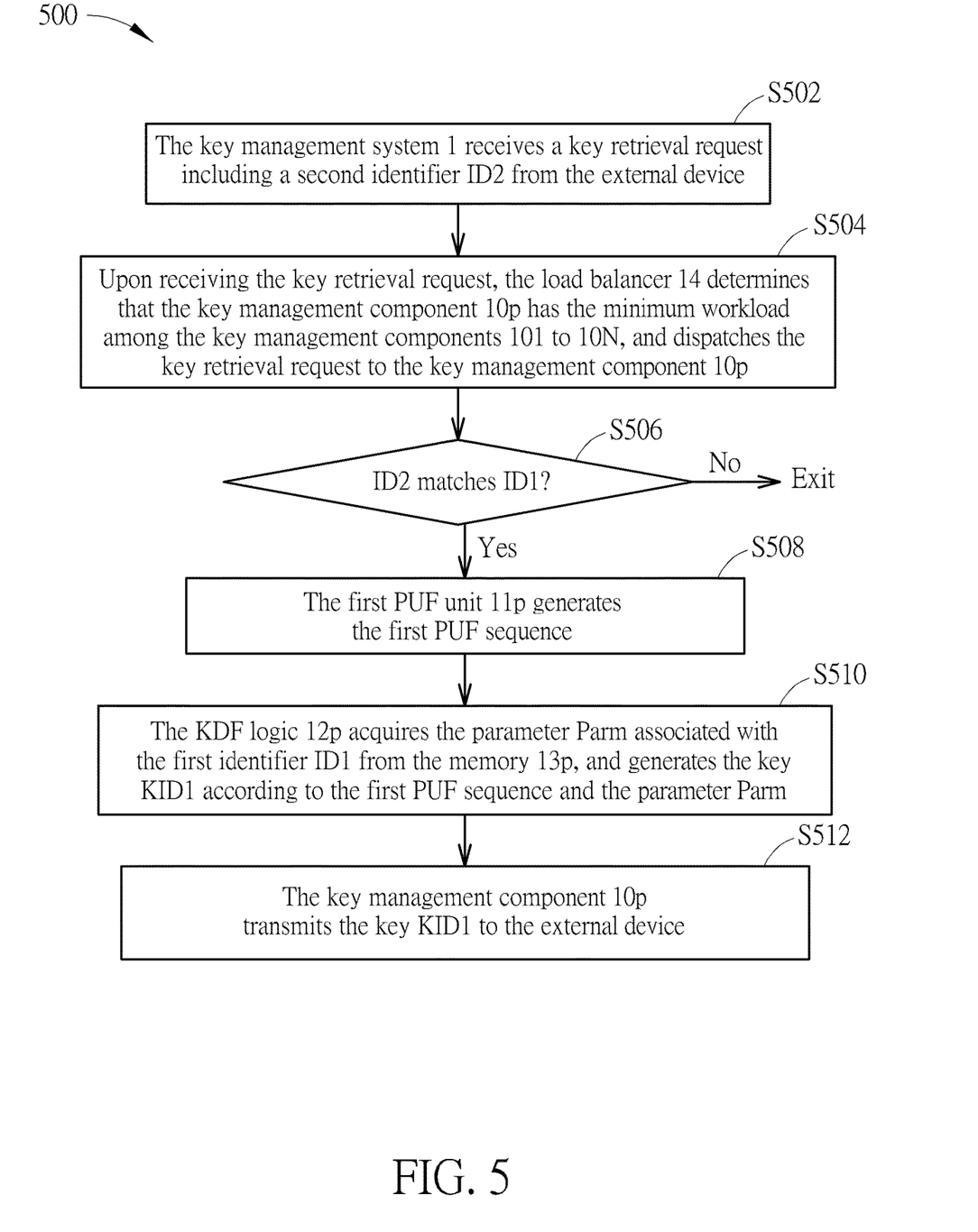
FIG. 5 is a flowchart of a method of operating the key management system in FIG. 1 for key retrieval.

FIG. 5 is a flowchart of a method 500 of operating the key management system 1 for key retrieval. The method 500 includes Steps S502 to S512 to employ a key generator for key retrieval. Any reasonable technological change or step adjustment is within the scope of the disclosure. Steps S502 to S512 are provided as follows:

Step S502: The key management system 1 receives a key retrieval request including a second identifier ID2 from the external device;

Step S504: Upon receiving the key retrieval request, the load balancer 14 determines that the key management component 10$p$ has the minimum workload among the key management components 101 to 10N, and dispatches the key retrieval request to the key management component 10$p$;

Step S506: The KDF logic 12$p$ determines whether the second identifier ID2 matches the first identifier ID1 in the memory 13$p$? if so, go to Step S512; and if not, exit the method 500;

Step S508: The first PUF unit 11$p$ generates the first PUF sequence;

Step S510: The KDF logic 12$p$ acquires the parameter Parm associated with the first identifier ID1 from the memory 13$p$, and generates the key KID1 according to the first PUF sequence and the parameter Parm;

Step S512: The key management component 10$p$ transmits the key KID1 to the external device.

In Step S504, the load balancer 14 selects the key management component 10$p$ based on the workloads of the key management components 101 to 10N. In some embodiments, the key management component 10$p$ may have the lowest workload among the key management components 101 to 10N at the time of receiving the key retrieval request, so as to achieve load balance of the key management components 101 to 10N.

In Step S506, the KDF logic 12$p$ searches the memory 13$p$ for finding a match of the second identifier ID2 in the key retrieval request. Accordingly, the key management component 10$p$ is the key generator, and the first identifier ID1 and the parameter Parm are stored in the memory 13$p$. If the second identifier ID2 matches the first identifier ID1, the first PUF unit 11$p$ generates the first PUF sequence (S508), the KDF logic 12$p$ acquires the parameter Parm associated with the first identifier ID1 from the memory 13$p$, and recovers the key KID1 using the parameter Parm and the first PUF sequence (S510), and the key management component 10$p$ transmits a key retrieval response including the key KID1 (S512), thus completing the method 500.

If no match of the second identifier ID2 can be found from the memory 13$p$, the method 500 is exited.

Figure 6:
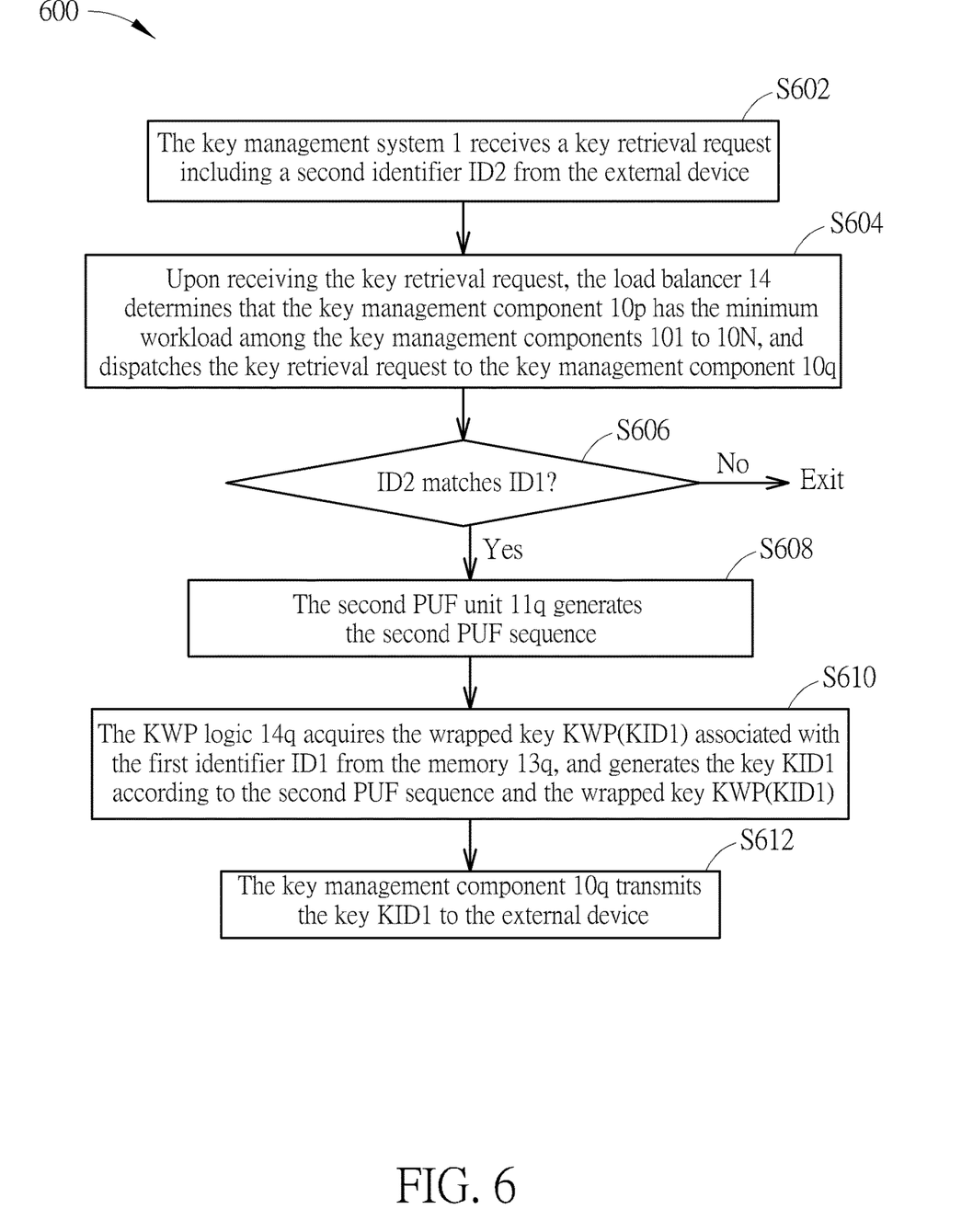
FIG. 6 is a flowchart of another method of operating the key management system in FIG. 1 for key retrieval.

FIG. 6 is a flowchart of another method 600 of operating the key management system 1 for key retrieval. The method 600 includes Steps S602 to S612 to employ a key backup storage for key retrieval. Any reasonable technological change or step adjustment is within the scope of the disclosure. Steps S602 to S612 are provided as follows:

Step S602: The key management system 1 receives a key retrieval request including a second identifier ID2 from the external device;

Step S604: Upon receiving the key retrieval request, the load balancer 14 determines that the key management component 10$p$ has the minimum workload among the key management components 101 to 10N, and dispatches the key retrieval request to the key management component 10$q$;

Step S606: The KWP logic 14*q* determines whether the second identifier ID2 matches the first identifier ID1 in the memory 13*q*? if so, go to Step S612; and if not, exit the method 600;

Step S608: The second PUF unit 11*q* generates the second PUF sequence;

Step S610: The KWP logic 14*q* acquires the wrapped key KWP(KID1) associated with the first identifier ID1 from the memory 13*q*, and generates the key KID1 according to the second PUF sequence and the wrapped key KWP(KID1);

Step S612: The key management component 10*q* transmits the key KID1 to the external device.

In Step S604, the load balancer 14 selects the key management component 10*p* based on the workloads of the key management components 101 to 10N. In some embodiments, the key management component 10*q* may have the lowest workload among the key management components 101 to 10N at the time of receiving the key retrieval request, so as to achieve load balance of the key management components 101 to 10N.

In Step S606, the KWP logic 14*q* searches the memory 13*q* for finding a match of the second identifier ID2 in the key retrieval request. Accordingly, the key management component 10*q* is the key backup storage, and the first identifier ID1 and the wrapped key KWP(KID1) are stored in the memory 13*q*. If the second identifier ID2 matches the first identifier ID1, the first PUF unit 11*q* generates the second PUF sequence (S608), the KWP logic 14*q* acquires the wrapped key KWP(KID1) associated with the first identifier ID1 from the memory 13*q*, and recovers the key KID1 using the wrapped key KWP(KID1) and the first PUF sequence (S610), and the key management component 10*q* transmits a key retrieval response including the key KID1 (S612), thus completing the method 600.

If no match of the second identifier ID2 can be found from the memory 13*q*, the method 600 is exited.

In the embodiments of FIGS. 1 to 6, the key management system 1 utilizes PUF units to enhance the security of data storage in the key management system 1, and utilizes a load balancer to linearly expand the system capacity by increasing the number of key management components, while maintaining operations for cryptographic keys in a simple, reliable and secure manner.

Those skilled in the art will readily observe that numerous modifications and alterations of the component and method may be made while retaining the teachings of the invention. Accordingly, the above disclosure should be construed as limited only by the metes and bounds of the appended claims.

What is claimed is:

1. A key management system based on a physically unclonable function (PUF), the key management system comprising:
 a plurality of key management components (KMCs), each KMC comprising:
  a PUF unit;
  a key derivation function (KDF) logic coupled to the PUF unit;
  a key wrap (KWP) logic coupled to the PUF unit; and
  a memory coupled to the KDF logic and the KWP logic;
 a load balancer coupled to the plurality of key management components and configured to dispatch a key generation request including a parameter from an external device according to workload of each KMC; and
 a backup channel coupled to the plurality of key management components;
 wherein a KMC having minimum workload among the plurality of KMCs is designated as the key-generation KMC and the key generation request is dispatched thereto, and remaining KMCs of the plurality of KMCs are designated as backup KMCs;
 wherein upon receiving the key generation request, a PUF unit of the key-generation KMC is configured to generate a first PUF sequence, a KDF logic of the key-generation KMC is configured to generate a key according to the parameter and the first PUF sequence, the key-generation KMC is configured to transmit a key storage request including the key and a first identifier associated therewith to the backup KMCs through the backup channel and transmit the first identifier to the external device, a KWP logic of the key-generation KMC is disabled, and a memory of the key-generation KMC is configured to store the first identifier and the parameter associated therewith;
 wherein once the backup KMCs receive the key storage request, each PUF unit of each backup KMC is configured to generate a second PUF sequence, each KDF logic of the each backup KMC is disabled, each KWP logic of the each backup KMC is configured to generate a wrapped key according to the key and the second PUF sequence, and a memory of the backup KMC is configured to store the first identifier and the wrapped key associated therewith;
 wherein the key management system is further configured to receive a key retrieval request including a second identifier from the external device;
 the load balancer is further configured to select a KMC from the plurality of KMCs having minimum workload among the plurality of KMCs upon receiving the key retrieval request, and dispatch the key retrieval request to the selected KMC, the selected KMC being the key-generation KMC; and
 if the second identifier matches the first identifier in the memory of the key-generation KMC, the PUF unit of the key-generation KMC is further configured to generate the first PUF sequence, the KDF logic of the key-generation KMC is further configured to acquire the parameter associated with the first identifier from the memory of the key-generation KMC, and generate the key according to the first PUF sequence and the parameter, and the key-generation KMC is further configured to transmit the key to the external device.

2. The key management system of claim 1, wherein the key-generation KMC and the backup KMC are located on a common device, and the backup channel is a data bus.

3. The key management system of claim 1, wherein the key-generation KMC and the backup KMC are located on different devices, and the backup channel is a network.

4. The key management system of claim 1, wherein the backup channel is a secure channel.

5. A key management system based on a physically unclonable function (PUF), the key management system comprising:
 a plurality of key management components (KMCs), each KMC comprising:
  a PUF unit;
  a key derivation function (KDF) logic coupled to the PUF unit;
  a key wrap (KWP) logic coupled to the PUF unit; and
  a memory coupled to the KDF logic and the KWP logic;

a load balancer coupled to the plurality of key management components and configured to dispatch a key generation request including a parameter from an external device according to workload of each KMC; and a backup channel coupled to the plurality of key management components;

wherein a KMC having minimum workload among the plurality of KMCs is designated as the key-generation KMC and the key generation request is dispatched thereto, and remaining KMCs of the plurality of KMCs are designated as backup KMCs;

wherein upon receiving the key generation request, a PUF unit of the key-generation KMC is configured to generate a first PUF sequence, a KDF logic of the key-generation KMC is configured to generate a key according to the parameter and the first PUF sequence, the key-generation KMC is configured to transmit a key storage request including the key and a first identifier associated therewith to the backup KMCs through the backup channel and transmit the first identifier to the external device, a KWP logic of the key-generation KMC is disabled, and a memory of the key-generation KMC is configured to store the first identifier and the parameter associated therewith;

wherein once the backup KMCs receive the key storage request, each PUF unit of each backup KMC is configured to generate a second PUF sequence, each KDF logic of the each backup KMC is disabled, each KWP logic of the each backup KMC is configured to generate a wrapped key according to the key and the second PUF sequence, and a memory of the backup KMC is configured to store the first identifier and the wrapped key associated therewith;

wherein the key management system is further configured to receive a key retrieval request including a second identifier from the external device;

the load balancer is further configured to select a KMC from the plurality of KMCs having minimum workload among the plurality of KMCs upon receiving the key retrieval request, and dispatch the key retrieval request to the selected KMC, the selected KMC being a selected backup KMC of the backup KMCs; and if the second identifier matches the first identifier in a memory of the selected backup KMC, a PUF unit of the selected backup KMC is configured to generate the second PUF sequence, a KWP logic of the selected backup KMC is configured to acquire the first wrapped key associated with the first identifier from the memory of the selected backup KMC, and generate the key according to the second PUF sequence and the wrapped key, and the selected backup KMC is configured to transmit the key to the external device.

6. A method of operating a physically unclonable function (PUF)-based key management system, the PUF-based key management system comprising a load balancer, a plurality of key management components (KMCs), and a backup channel, the load balancer being coupled to the plurality of KMCs, the backup channel being coupled to the plurality of KMCs, each KMC comprising a PUF unit, a key derivation function (KDF) logic, a key wrap (KWP) logic and a memory, the method comprising:

the load balancer dispatching a key generation request including a parameter from an external device according to workload of each KMC, wherein a KMC having minimum workload among the plurality of KMCs is designated as the key-generation KMC and the key generation request is dispatched thereto, and remaining KMCs of the plurality of KMCs are designated as backup KMCs;

disabling a KWP logic of the key-generation KMC and KDF logics of the backup KMCs of the plurality of KMCs;

upon the key-generation KMC receiving the key generation request, a PUF unit of the key-generation KMC generating a first PUF sequence, and a KDF logic of the key-generation KMC generating a key according to the parameter and the first PUF sequence;

the key-generation KMC transmitting the first identifier to the external device;

a memory of the key-generation KMC storing the first identifier and the parameter;

the key-generation KMC transmitting a key storage request including the key and a first identifier associated therewith to the backup KMCs via the backup channel;

once the backup KMCs receive the key storage request, each PUF unit of each backup KMC generating a second PUF sequence, and each KWP logic of the each backup KMC generating a wrapped key according to the key and the second PUF sequence;

each memory of the each backup KMC storing the first identifier and the wrapped key;

the key management system receiving a key retrieval request including a second identifier from the external device;

upon receiving the key retrieval request, the load balancer selecting a KMC from the plurality of KMCs having minimum workload among the plurality of KMCs, and dispatching the key retrieval request to the key-generation KMC, wherein the selected KMC is the key-generation KMC; and if the second identifier matches the first identifier in the memory of the key-generation KMC, the PUF unit of the key-generation KMC generating the first PUF sequence, the KDF logic of the key-generation KMC acquiring the parameter associated with the first identifier from the memory of the key-generation KMC, and generating the key according to the first PUF sequence and the parameter, and the key-generation KMC transmitting the key to the external device.

7. A method of operating a physically unclonable function (PUF)-based key management system, the PUF-based key management system comprising a load balancer, a plurality of key management components (KMCs), and a backup channel, the load balancer being coupled to the plurality of KMCs, the backup channel being coupled to the plurality of KMCs, each KMC comprising a PUF unit, a key derivation function (KDF) logic, a key wrap (KWP) logic and a memory, the method comprising:

the load balancer dispatching a key generation request including a parameter from an external device according to workload of each KMC, wherein a KMC having minimum workload among the plurality of KMCs is designated as the key-generation KMC and the key generation request is dispatched thereto, and remaining KMCs of the plurality of KMCs are designated as backup KMCs;

disabling a KWP logic of the key-generation KMC and KDF logics of the backup KMCs of the plurality of KMCs;

upon the key-generation KMC receiving the key generation request, a PUF unit of the key-generation KMC generating a first PUF sequence, and a KDF logic of the key-generation KMC generating a key according to the parameter and the first PUF sequence;

the key-generation KMC transmitting the first identifier to the external device;

a memory of the key-generation KMC storing the first identifier and the parameter;

the key-generation KMC transmitting a key storage request including the key and a first identifier associated therewith to the backup KMCs via the backup channel;

once the backup KMCs receive the key storage request, each PUF unit of each backup KMC generating a second PUF sequence, and each KWP logic of the each backup KMC generating a wrapped key according to the key and the second PUF sequence;

each memory of the each backup KMC storing the first identifier and the wrapped key;

the key management system receiving a key retrieval request including a second identifier from the external device;

upon receiving the key retrieval request, the load balancer selecting a KMC from the plurality of KMCs having minimum workload among the plurality of KMCs, and dispatching the key retrieval request to the key-generation KMC, wherein the selected KMC is a selected backup KMC of the backup KMCs; and if the second identifier matches the first identifier in a memory of the selected backup KMC, a PUF unit of the backup KMC backup KMC generating the second PUF sequence, a KWP logic of the selected backup KMC acquiring the wrapped key associated with the first identifier from the memory of the selected backup KMC, and generating the key according to the second PUF sequence and the wrapped key, and the selected backup KMC transmitting the key to the external device.

* * * * *